United States Patent [19]

Bollman

[11] Patent Number: 4,986,194
[45] Date of Patent: Jan. 22, 1991

[54] MULTI-ADJUSTABLE, MULTI-FUNCTIONAL, SPACE SAVING WORKPLACE SYSTEM

[76] Inventor: Clifford J. Bollman, 715 NE. 138th, Vancouver, Wash. 98664

[21] Appl. No.: 304,879

[22] Filed: Jan. 30, 1989

Related U.S. Application Data

[63] Continuation of Ser. No. 935,250, Nov. 26, 1986, abandoned.

[51] Int. Cl.⁵ .............................................. A47B 3/00
[52] U.S. Cl. ..................................... 108/111; 108/60; 108/64
[58] Field of Search .................... 108/111, 60, 64, 65, 108/66, 50, 153, 59; 211/184; 312/196, 194, 279, 233, 20 B, 132 R

[56] References Cited

U.S. PATENT DOCUMENTS

| | | | |
|---|---|---|---|
| 929,308 | 7/1909 | Hurteau | 108/106 |
| 1,181,331 | 5/1916 | Metzger | 312/138 R |
| 1,350,047 | 8/1920 | Way | 312/138 R X |
| 1,801,531 | 4/1931 | Ulmer, Jr. | 312/233 X |
| 1,928,936 | 10/1933 | Henricson | 312/196 |
| 2,820,551 | 1/1958 | Mount | 108/107 |
| 2,908,400 | 10/1959 | Richter | 108/60 |
| 2,942,924 | 6/1960 | Stangert | 108/60 X |
| 3,279,876 | 10/1966 | Cyr | 108/107 X |
| 3,326,149 | 6/1967 | Mitchell et al. | 108/111 |
| 3,401,652 | 9/1968 | Thor | 108/106 |
| 3,601,462 | 8/1971 | Fenwick | 312/138 R |
| 3,620,174 | 11/1971 | Dentino | 108/23 X |
| 3,635,174 | 1/1972 | Ball et al. | 108/50 X |
| 3,786,765 | 1/1974 | Burr | 108/60 |
| 3,858,253 | 1/1975 | Lauzon | 312/279 X |
| 3,858,528 | 1/1975 | Petersen | 108/60 |
| 3,869,992 | 3/1975 | Kramer | 108/60 |
| 3,881,428 | 5/1975 | Klecki | 108/60 X |
| 4,323,291 | 4/1982 | Ball | 108/150 X |
| 4,378,727 | 4/1983 | Doss | 108/60 X |
| 4,484,787 | 11/1984 | Stephens | 108/60 X |
| 4,582,002 | 4/1986 | Wright | 108/111 |
| 4,612,863 | 9/1986 | Vonhausen et al. | 108/50 X |
| 4,637,666 | 1/1987 | Worrell et al. | 312/196 |

FOREIGN PATENT DOCUMENTS 1320699 6/1973 United Kingdom .................. 108/65

Primary Examiner—José V. Chen
Attorney, Agent, or Firm—Marger, Johnson, McCollom & Stolowitz, Inc.

[57] ABSTRACT

This disclosure is directed to a multi-adjustable, multi-functional, space saving workplace system. The subject workplace system comprises a substantially horizontal table member including a first slot located within the top horizontal surface at the rearward portion of the table member. The plan view of the table member is substantially V-shaped. The portion of the table member forward of the slot forms a work surface for conducting workplace operations. The table member is supported in a substantially horizontal position with respect to the vertical axis of the workplace system.

A substantially horizontally-disposed covering member is located above the first slot and is disposed substantially parallel to the table member. The covering member provides acoustical integrity for workers located within the confines of the workplace system. It includes second slot located in the bottom horizontal surface at the rearward portion of the covering member.

23 Claims, 3 Drawing Sheets

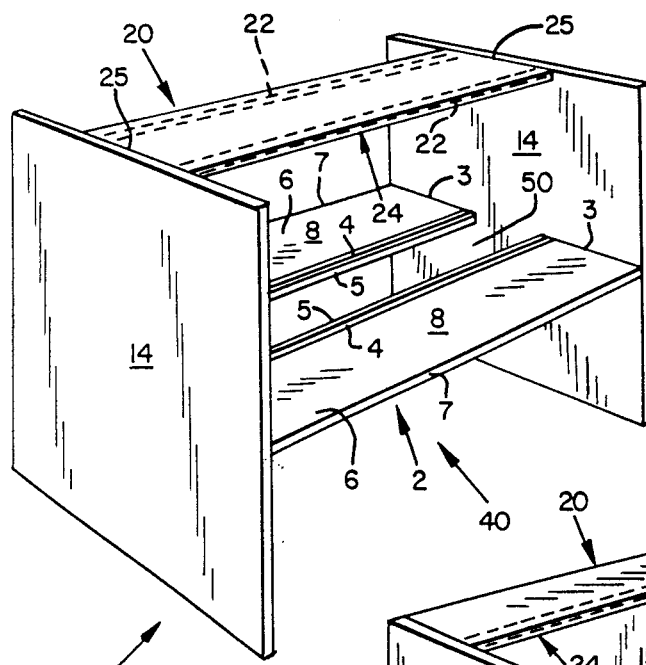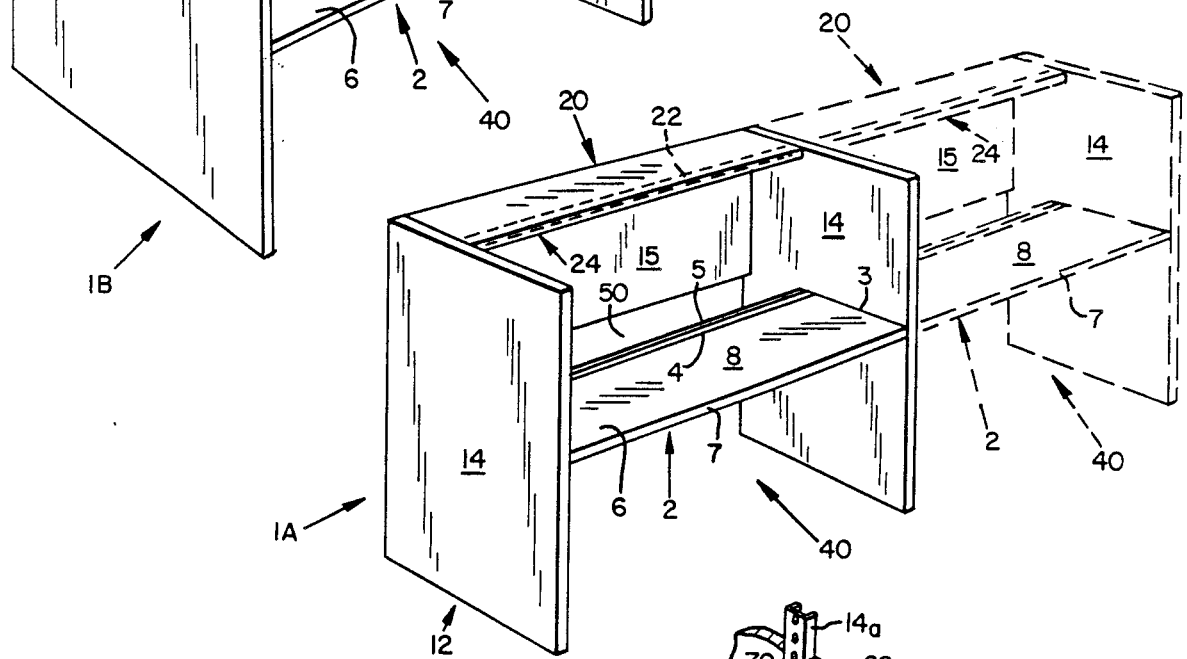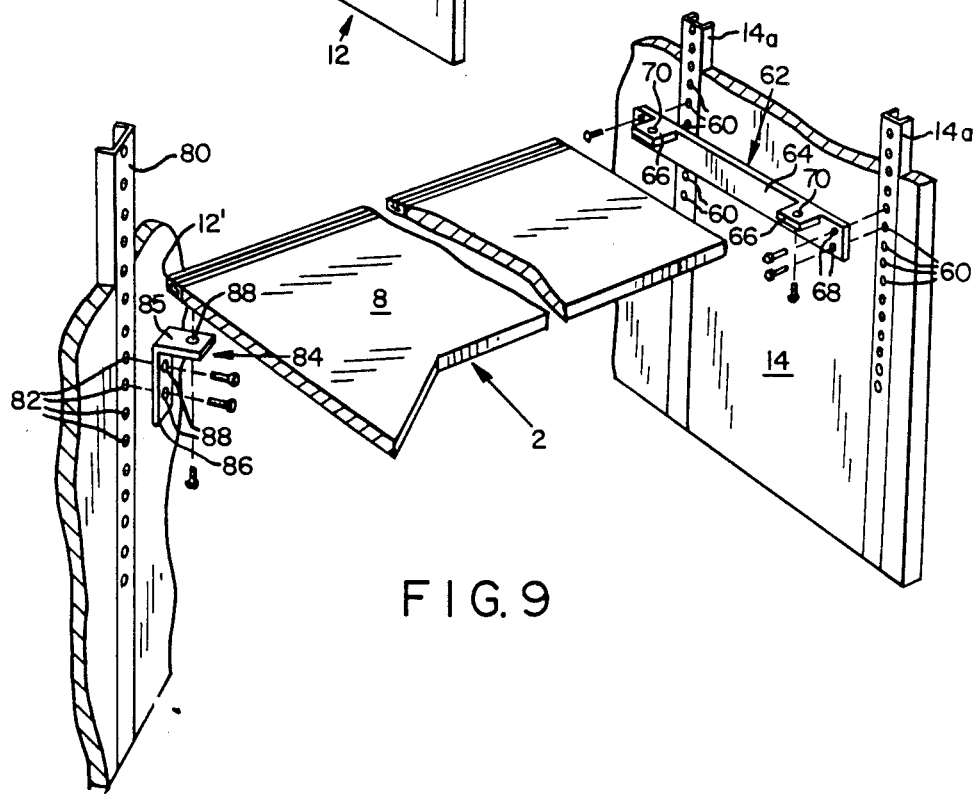

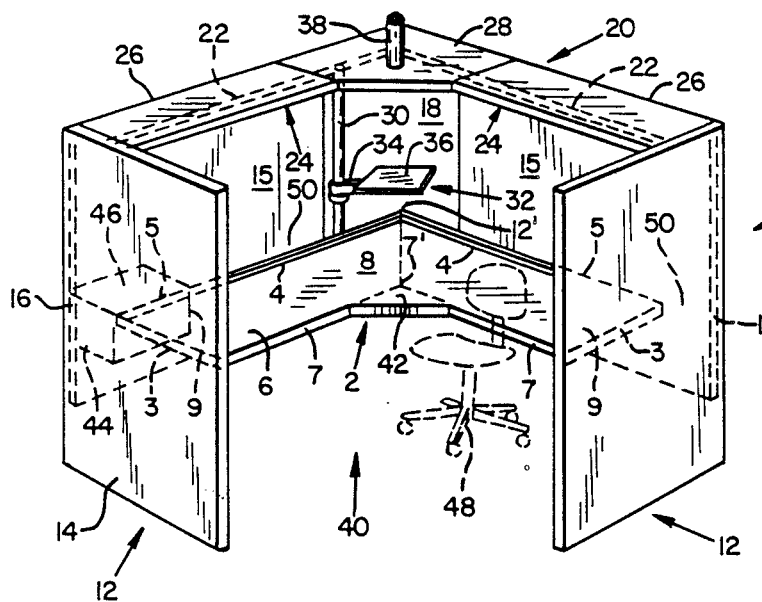
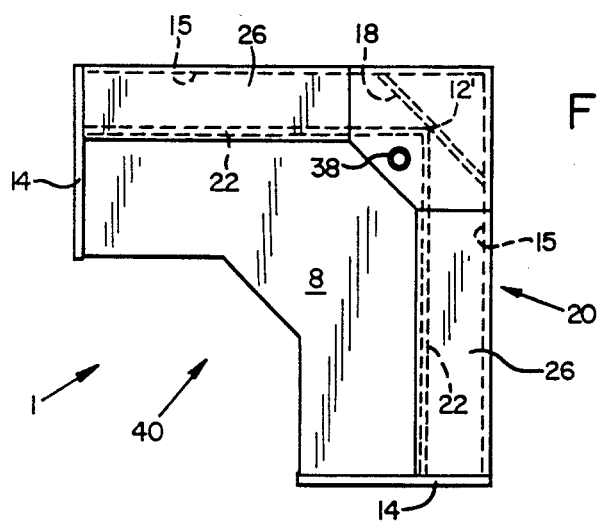
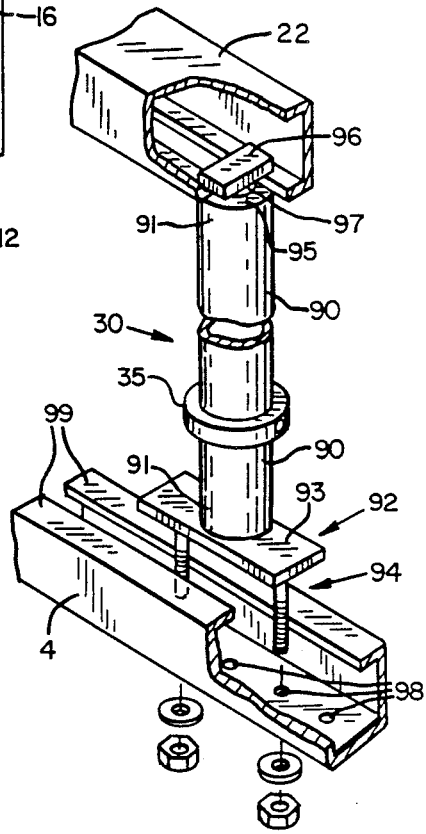
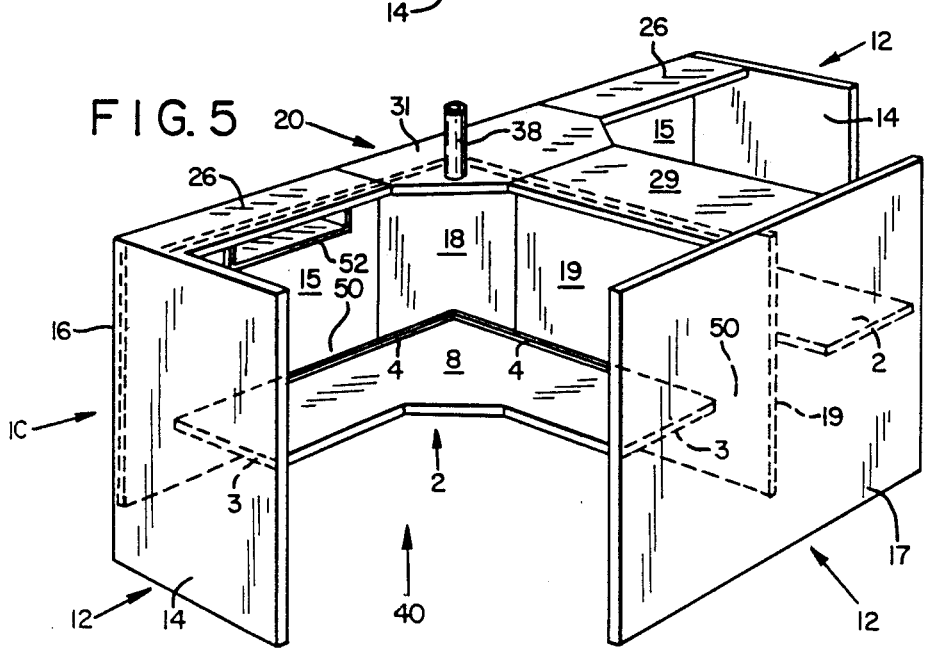

4,986,194

MULTI-ADJUSTABLE, MULTI-FUNCTIONAL, SPACE SAVING WORKPLACE SYSTEM

This is a continuation of co-pending application Ser. No. 06/935,250 filed on Nov. 26, 1986, now abandoned.

BACKGROUND OF THE INVENTION

This invention relates to an adjustable, multi-functional, space-saving workplace system which provides an acoustically-controlled work compartment within its confines.

The modular office system industry has grown dramatically in the last several years. Employers are attempting to locate as many of their employees as possible in a given office area so that their space usage will be maximized and their costs will be minimized. The cost of providing and installing such modular units, as compared to conventional office construction, is less, the installation time is reduced, and the units are portable and readily movable to another location if need be.

However, a number of problems have evolved. A major problem is the effective separation of respective co-workers from each other and from the outside environment which is easily done when individual offices are conventionally constructed using permanent walls. Conventional modular units do not provide effective sound and visual barriers for separating respective co-workers.

A further problem resides in the minimum functionality of conventional modular units. Instead of providing maximum functionality, these units are limited in that they perform certain fixed, defined functions and cannot be adapted for other purposes. In this way they are still much like conventional furniture. For example, these conventional modular units are limited as to what can be attached to the unit, its size, where and how attachment can take place, and what minimum adjustability, if any, is imparted to the system. The units also include numerous inherent structures requisite to supporting the system which interfere with the user's movement and result in the minimization of open space for storage and for attachment of accessories.

Another major problem inherent in conventional modular units is a minimum work surface area and a minimum internal storage as compared to conventional office space. Storage above and below table members in modular work areas are not significantly utilized.

Finally, wiring for office utilities used within the modular work area provide safety and aesthetic problems since they are generally strewn about the floor of the unit.

Accordingly, there is a need for a workplace system which comports with conventionally constructed offices but which is modular in nature.

SUMMARY OF THE INVENTION

The present invention is directed to an adjustable, multi-functional, space-saving workplace system which although modular in construction emulates conventionally constructed office space. The workplace system can be built at a much lower cost than conventional modular units since most of its construction is non-load bearing. Most inherent support structures have also been eliminated from the subject workplace system so that maximum open space for storage and attachment of accessories is achieved in a much smaller work area. At the same time, the above-described problems normally associated with modular work area units have been eliminated.

A key feature of this invention is the use of vertical and/or horizontal suspension of accessories by mounting same in vertical and/or horizontal slot means. This maximizes functionality and adjustability since by employing any one of an unlimited number of suspended accessories, maximum functionality and adaptability will follow. Furthermore, one can duplicate all that is done by conventional modular or non-modular systems. Thus, one can control what is attached, what size it is, where and how it is attached, as well as its adjustability by employing the system of the present invention, while at the same time minimizing cost and reducing assembly time. What also has been recognized is that a substantial portion of the vertical support members which are conventionally employed can be replaced by non-support vertical members.

The use of the workplace system of this invention minimizes inherent support structures by including a minimum number of vertical support structures. Reducing the number of inherent structures provides more open space for attachment of accessories and more storage room to put accessories.

The subject workplace system comprises a substantially horizontal table member including a first slot means located within the top horizontal surface at the rearward portion of said table member. The portion of the table member forward of said slot means forms a work surface for conducting workplace operations. Means are provided for supporting the table member in a substantially horizontal position with respect to the vertical axis of the workplace system so that the area above and below the table member within the workplace compartment is substantially unobstructed by permanent support structures.

A substantially horizontally-disposed covering member is located above the first slot means and is disposed substantially parallel to the table member. The covering member provides acoustical integrity for workers located within the confines of the workplace system. It includes second slot means located in the bottom horizontal surface at the rearward portion of the covering member.

The respective first and second slot means have a substantially identical configuration and are disposed for vertical alignment one with respect to the other. The vertically aligned first and second slot means are capable of receiving at least one stanchion means and interlockingly supporting same in a substantially vertical position with respect to the vertical axis of the workplace system. Thus, each stanchion means is capable of supporting above the top of the table member at least one accessory means connected thereto. In this way, substantial internal storage can be achieved within the interior of the workplace system thereby utilizing available space above the table top level.

Means for supporting the covering means in a substantially horizontal position with respect to the vertical axis of the workplace system are also provided. Together, the table and covering members and the table and covering support members, respectively, define an acoustically-controlled workplace compartment. Persons working within the confines of this compartment can be effectively acoustically and aesthetically separated from their surrounding environment.

The table member of the workplace system of the present invention preferably has a plan configuration which is substantially V-shaped. The V-shaped table member is horizontally supported by attachment to the table member support means only at its respective ends, a recessed area thereby being formed between the respective rearward V-shaped portion of the table member and the table member support means. This recessed area is capable of forming a storage area below the top of the table member. Therefore, substantial storage of materials ca be furnished within the confines of the workplace system below the level of the table member top. The recessed area includes receptacle means for storing materials therewithin disposed below the top horizontal surface of the table member. The receptacle means preferably includes a top cover which, in the open position, allows removal of the materials located therewith, and which., in the closed position, forms a further solid top for the table member.

Typically, the V-shaped table member comprises a pair of rectangular-shaped leg members joined at right angles one to the other, and further includes a triangular-shaped work surface section connected to the table member at the apex of the forward V-shaped portion formed by the pair of leg members. This changes the work surface focal point and results in substantial additional amount of working surface for the user. Preferably, the respective first and second slot means and the plan configuration of the covering member are substantially V-shaped.

In the workplace system of this invention, the respective table and covering members are supported by the same substantially vertically-extending support means.

The vertically-extending support means generally comprises vertically-extending panel means attached to the respective table and covering members which together define an acoustically-controlled work enclosure capable of substantially preventing sound from entering into, or emanating from within, the confines of the workplace system.

A multi-compartment, adjustable, multi-functional, space-saving workplace system can be formed comprising a plurality of the above-described single-compartment, multi-functional, space-saving workplace systems joined one to the other. For example, a two-compartment, adjustable, multi-functional, space-saving workplace system can be produced by joining one to the other a pair of single-compartment, multi-functional, space-saving workplace systems, and a four-compartment system can be formed by joining four single-compartment systems one to the other.

This workplace system could be an industry standard since it satisfies the requisites for conventional constructed offices.

The foregoing and other objects, features and advantages of this invention will become more readily apparent from the following detailed description of a preferred embodiment which proceeds with reference to the accompanying drawings.

BRIEF DESCRIPTION OF THE DRAWINGS

FIG. 1 is a perspective view of a single compartment adjustable, multi-functional, space-saving workplace system of the present invention wherein the compartment and table member 2 has a substantially rectangular plan configuration and a second workplace system is shown in phantom in a side-by-side relationship one to the other.

FIG. 2 is a perspective view of a two compartment adjustable, multi-functional, space saving workplace system, having a rectangularly configured compartment and table member, the compartments being in back-to-back relationship one to the other.

FIG. 3 is a perspective view of a single compartment adjustable, multi-functional, space-saving workplace system of the present invention, wherein the compartment and table member have a substantially V-shaped plan configuration.

FIG. 4 is a plan view of the workplace system depicted in FIG. 3.

FIG. 5 is a perspective view of a two-compartment adjustable, multi-functional, space-saving workplace system of the present invention, each compartment and table member having a substantially V-shaped plan configuration.

FIG. 9 is an exploded, fragmentary view depicting the attachment of table member 2 of FIGS. 3–8 at the ends 3 and apex 12'.

FIG. 10 is a fragmentary view, broken away, of the stanchion means 30 of FIG. 3.

DETAILED DESCRIPTION OF PREFERRED EMBODIMENT

Figure 6:
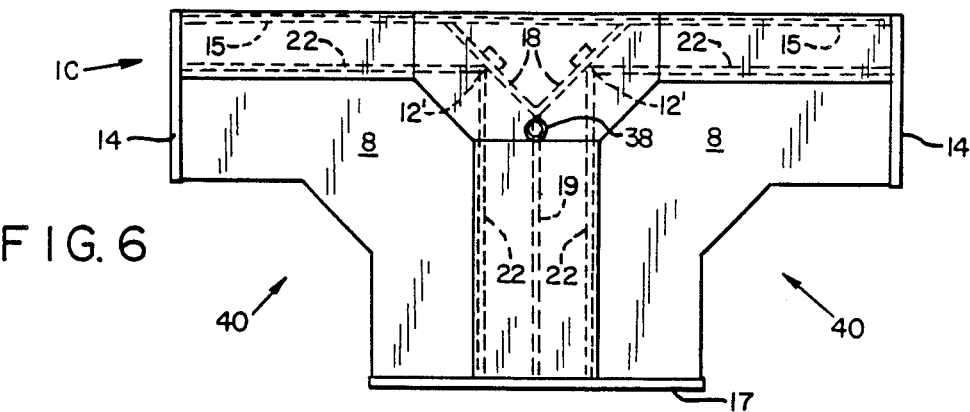
FIG. 6 is a plan view of the workplace system depicted in FIG. 5.

Referring now to FIG. 1, an adjustable multi-functional, space-saving workplace system 1A is depicted having a single acoustically-controlled work compartment 40 located within its confines including a rectangular horizontal table member 2. A second workplace system, constructed in a similar manner to workplace system 1A, is shown in phantom and is disposed in a side-by-side relationship with respect to the first workplace system 1A, being connected to workplace system 1 at a common wall, which in this case is a vertical end panel support means 14.

The workplace system 1A comprises a substantially horizontal table member 2 including a slot means 4 located within the top horizontal surface 6 at the rearward portion 5 of the table member. The portion of the table member forward of slot means 4 forms a work surface 8 for conducting workplace operations. Table member 2 is horizontally supported by attachment to its respective ends 3 to vertical end panel support means 14. Vertical support end panel means 14 are connected to rearward support panel means 15 for bracing the workplace system 1. A recessed area 50 is formed between table member rearward portion 5 and rearward support panel means 15. This recessed area when used in connection with receptacle means (see for example FIG. 3) can be employed as an area for storing materials below the top level of table member 2.

Workplace system 1A further comprises a substantially horizontally-disposed covering member 20 located directly above first slot means 4 and disposed substantially parallel to rearward portion 5 of table member 2. Covering member 20 includes slot means 22 located in its bottom horizontal surface 24. Slot means 4 and 22 are substantially identical in configuration and are disposed for vertical alignment one with respect to the other.

FIG. 2 depicts a two-compartment, back-to-back workplace system 1B having a pair of horizontal table members 2 located in parallel relationship one to the other with a recessed area 50 disposed therebetween. The table members 2 are connected at their respective ends 3 to vertical end support panel means 14. A covering member 20 is also connected at its respective ends 25 to panel means 14. Covering member 20 includes a pair of slot means 22 located in the bottom surface 24. Slot means 4 of table members 2 and the pair of slot means 22 of covering member 20 are substantially identical in configuration and are disposed for vertical alignment one with respect to the other.

Referring now to FIGS. 3 and 4, an adjustable multi-functional, space-saving workplace system 1 having a single acoustically-controlled work compartment 40 located within its confines.

The workplace system of this invention comprises a substantially horizontal table member 2 including a first slot means 4 located within the top horizontal surface 6 at the rearward portion 5 of the table member. The portion of the table member forward of slot means 4 forms a work surface 8 for conducting workplace operations. The user sits in a chair 48 (in phantom) adjacent to the forward portion 7 of table member 2 within compartment 40 for conducting various work activities. More specifically, compartment 40 and table member 2 preferably have a plan configuration which is substantially V-shaped. The V-shaped table member comprises a pair of rectangular-shaped leg members 9 joined at right angles one to the other. The table member also includes a triangular-shaped work surface section 7' which is connected to table member 2 at the apex of the forward V-shaped portion 7 formed by the pair of leg members 9.

Table member 2 is supported in a horizontal plane for adjustable movement in an upward and downward vertical direction by attachment at its respective ends 3 to the vertical end panel support means 14. Vertical end support panel means 14 each include a pair of substantially parallel vertical support sections 14a each having a series of horizontally aligned apertures 60 located therewithin for receiving a horizontal bracket means 62 for adjustably supporting V-shaped table member 2 in a plurality of horizontal positions with respect to the vertical axis of the workplace system 1. Bracket means 62 comprises a laterally-extending rectangular flat plate means 64 having a pair of horizontally-extending mounting pads 66 extending outwardly at right angles from the face of plate means 64. Plate means 64 includes a pair of openings 68 disposed at each end for receiving screws to attach the plate means 64 within the apertures 60. Table member 2 is then connected to bracket means 62 by screws passing through apertures 70. This allows the rearward table member portion 5 to be free from connection to support means 12 except at one point, the apex 12' of rearward table member portions 5, to vertical support rearward end connector panel means 18. Connector panel means 18 includes a centrally-located vertical support section 80 having a plurality of apertures 82 located therein which are vertically aligned with apertures 60. The apex 12' is connected by mount bracket 84 comprising attachment sections 85 and 86 joined one to the other at right angles. Sections 85 and 86 include apertures 88 which receive screws to connect the apex 12' of table member 2 to panel means 18. In this way, there are no vertical support means below or above table member 2 within the workplace system 1 to impede the full and unobstructed use of those areas.

Support means 12 comprises vertical support end panel means 14 and vertical support rearward panel means 15, respectively, joined together one to the other at substantially right angles at point 16. Vertical support rearward panel means 15 are connected at their other end to the opposite ends of vertical connector support panel means 18 to form a vertically-extending upright enclosure. A recessed area 50 is formed between table member rearward portion 5 and vertical support rearward end connector panel means 15 and 18, respectively. This recessed area is substantially V-shaped in configuration and can be employed as an area for storing materials below the top level of table member 2. Recessed area 50 includes receptacle means 44 for storing materials therewithin. Receptacle means 44 is disposed below the top horizontal surface 8 of table member 2 and includes a top cover 46 which, in the open position, allows removal of the materials located therewithin and, in the closed position as shown, forms a solid top for table member 2.

Workplace system 1 further comprises a substantially horizontally-disposed ring member 35 located above first slot means 4 and disposed substantially parallel to table member 2. Covering member 20 includes second slot means 22 located in its bottom horizontal surface 24. First and second slot means 4 and 22 are substantially identical in configuration and are disposed for vertical alignment one with respect to the other. These vertically-aligned first and second slot means have connected thereto a stanchion means 30 which is supported in a substantially vertical position with respect to the vertical axis of workplace system 1. Stanchion means 30 comprises a vertical support post 90 which extends between first and second slot means 4 and 22 and connector means 92 for interlockingly attaching the post ends 91 in place therewithin. The lower post end 91 in this case is joined to a mount plate 93 which is connected within apertures 98 of first slot means 4 by a bolt assembly 94 including bolt, washer and nut means. The upper post end 95 includes a quick connect mechanism for attachment within second slot means 22 which comprises a stationary rotatable threaded pin 97 having a rectangular retaining tab 96 joined at its outer end. The narrower dimension of tab 96 is moved within the slot means 22, and then tab 96 is rotated to the point where the wider dimension becomes limited by the flange portion 99 of slot means 22. Stanchion means 30 has connected thereto accessory means 32 in the form of a horizontally-supported arm 34 which in turn supports horizontal platform means 36. Support platform 36 can then provide storage above the level of table member 2. Support arm 34 is pivotally connected to stanchion means 30 so that in use support platform 36 can be moved out above work surface 8, and during storage, can be moved back above recessed area 50. The ability to store materials and accessories above and below table member 2 without interfering with work being performed on work surface 8 helps maximize the use of workplace system 1.

Cover means 20 are substantially V-shaped in configuration and comprise horizontally disposed cover end sections 26 disposed at substantially right angle one with respect to the other and joined at their respective inner ends to horizontal cover connector section 28. The covering means 20 are supported in a substantially horizontal position with respect to the vertical axis of workplace system 1 by attachment to the top of rearward end connector vertical support panel means 15 and 18, respectively. Table and covering members 4 and 24 and support means 12, respectively, together define an acoustically-controlled workplace compartment 40.

Referring now to FIGS. 5-8, multi-compartment, adjustable, multi-functional, space-saving workplace systems 1C and 1D, are formed comprising a plurality of single compartment workplace system 1 which have been joined one to the other. More specifically, a two-compartment workplace system 1C is depicted in FIGS. 5 and 6. The individual compartments are joined one to the other along a common vertical barrier, namely, vertical central support panel means 19. The respective compartments also share a common forward vertical support panel means 17, horizontal cover central section 29 and horizontal cover central connector section 31 which is hexagonal in shape. In FIG. 5, an accessory means comprising a shelf 52 interlockingly attached within slot means 22 is provided.

Figure 7:
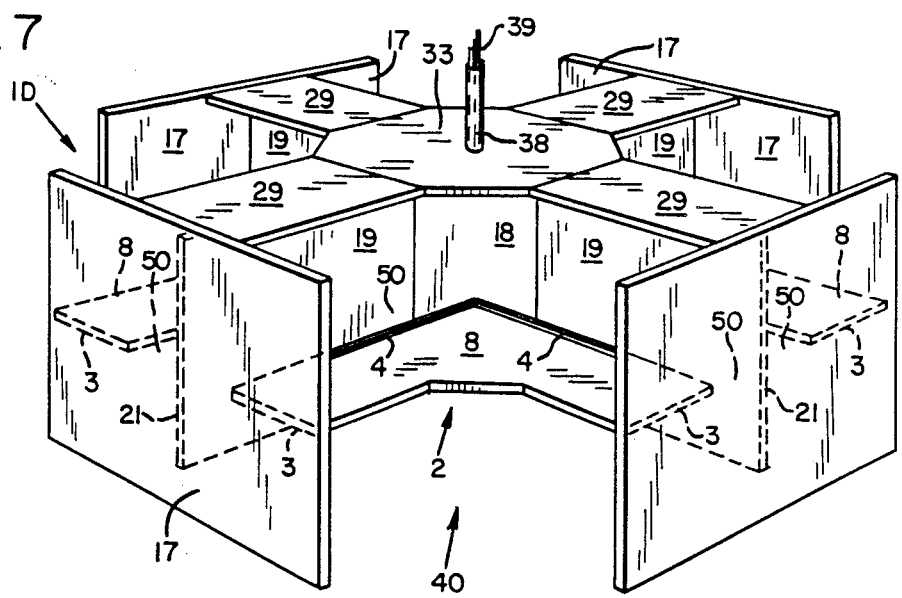
FIG. 7 is a perspective view of a four-compartment adjustable, multi-functional, space-saving workplace system of the present invention, each compartment and table member a substantially V-shaped plan configuration.
Figure 8:
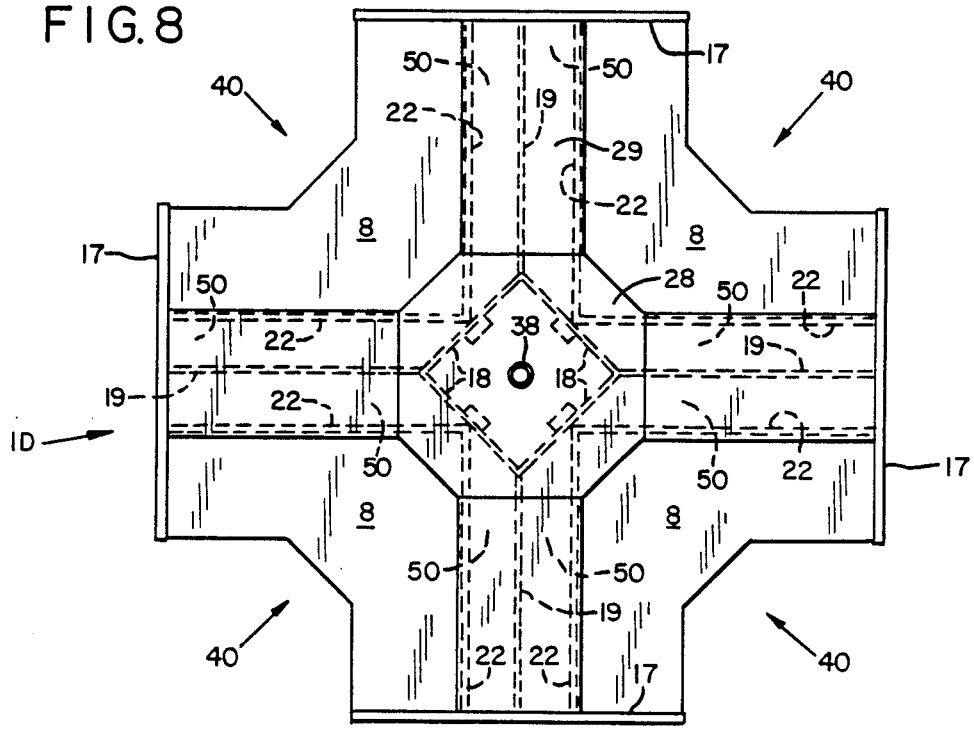
FIG. 8 is a plan view of the workplace system depicted in FIG. 7.

In a further preferred embodiment, a four-compartment, adjustable, multi-functional, space-saving, workplace system 1D is depicted in FIGS. 7 and 8. The four compartments are again joined one to the other at vertical central support panels 19 which are common barriers for their respective compartments. In this case, horizontal, cover, central connector section 33 is octagonally shaped.

Any of the workplace systems of this invention can conveniently include a utility service supply system 38 extending through covering means 20 into the confines of workplace system 1 for providing the requisite utility services for use therewithin. This avoids the problem of utility wires strewn on the floor. Conduit means containing utility wiring 39 such a electrical, telephone, computer wiring and the like can be employed to provide the system 38.

In addition to the utilitarian aspects of the subject workplace system, various aesthetic amenities can be provided. For instance, the various vertical panels and horizontal coverings employed can be manufactured employing a structural framework covered with materials such as a fabric covering and the like. Standard metal vertical and horizontal support members can be used in forming the structural framework. Wood, glass, and other decorative materials can also be incorporated in the panel design. Foam, fiberglass, hardboard or the like can be employed as the inner filling material if a fabric covering is employed.

Having illustrated and described the principles of my invention in a preferred embodiment, it should be apparent that the invention may be modified in arrangement and detail without departing from such principles. I claim all modifications within the spirit and scope of the following claims.

I claim:

1. An adjustable, multi-functional, space-saving workplace system, which comprises:
    a substantially horizontal table member having respective forward and rearward portions, and defining a work surface for conducting workplace operations in said forward portion, the plan configuration of said horizontal table member being substantially V-shaped;
    a substantially horizontal covering member having respective forward and rearward portions, located above and disposed substantially parallel to the top horizontal surface of said table member;
    means for supporting said respective table member and covering member in a substantially horizontal position with respect to the vertical axis of the workplace system,
    means located within and across the length of said rearward portion of a top horizontal surface of said table member defining a first slot for receiving and interlockingly attaching in place therewithin at least one accessory means;
    means located within and across the length of said rearward portion of the bottom horizontal surface of said cover member defining a second slot for receiving and interlockingly attaching in place therewith at least one accessory means;
    means defining an acoustically-controlled workplace compartment comprising the respective table and covering members together with the respective table and covering support members, said workplace compartment means providing a workplace which substantially surrounds a person working therewithin so as to effectively acoustically and aesthetically separate said person from the surrounding environment.

2. The workplace system of claim 1, wherein the table member is horizontally supported by attachment to the table member support means only at its respective ends, and said system further including means defining a recessed area located between a rearward V-shaped portion of the table member and the table member support means respectively, the recessed area means being capable of forming a storage area below the top of the table member.

3. The workplace system of claim 2, which further includes receptacle means disposed within the recessed area for storing materials therewithin disposed below the top horizontal surface of the table member.

4. The workplace system of claim 3, wherein the receptacle means includes a top cover which, in an open position, allows removal of materials located therewith and which, in a closed position, forms a further solid top for the table member.

5. The workplace system of claim 1, wherein the V-shaped table member comprises a pair of rectangular-shaped leg members joined at right angles one to the other.

6. The workplace system of claim 5, wherein the V-shaped table member includes a triangularly-shaped work surface section connected to the table member at an apex of a forward V-shaped portion formed by the pair of leg members.

7. The workplace system of claim 1, which further includes stanchion means for supporting a plurality of accessory means connected thereto within the first and second slot means, respectively, in a substantially vertical position with respect to the vertical axis of the workplace system.

8. The workplace system of claim 1, wherein the respective first and second slot means are substantially V-shaped.

9. The workplace system of claim 1, wherein the respective first and second slot means are substantially V-shaped with respect to the plan configuration of said respectively V-shaped table and covering members.

10. The workplace system of claim 1, wherein the respective table and covering members are supported by a same substantially vertically-extending support means.

11. The workplace system of claim 10, wherein the vertically-extending support means comprises vertically-extending panel means attached to the respective table and covering members.

12. The workplace system of claim 1 which further includes an overhead utility service supply system extending through the horizontal cover means into said workplace system for providing utility service for use within said workplace system.

13. The workplace system of claim 1, wherein said horizontal table member is disposed for adjustable upward and downward movement to a plurality of horizontal positions with respect to the vertical axis of said workplace system.

14. A multi-compartment, adjustable, multi-functional, space-saving workplace system, which comprises:
   a plurality of single-compartment, multi-functional, space-saving workplace systems joined one to the other,
   each respective single-compartment workplace system comprising a substantially horizontal table member, the plan configuration of said horizontal table member being substantially V-shaped;
   means within said table member defining a first slot for receiving and interlockingly attaching at least one accessory means in place therewithin, said first slot means located across the length of a top horizontal surface of said table member and at a rearward portion thereof;
   a work surface for conducting workplace operations formed in a portion of said table member forward of said first slot means;
   means connected to said table member for supporting the table member in a substantially horizontal position with respect to the vertical axis of the workplace system,
   a substantially horizontally-disposed covering member located above the first slot means and disposed substantially parallel to the top horizontal surface of said table member;
   means within said table member defining a second slot for receiving and interlockingly attaching at least one accessory means in place therewithin, said second slot means located across the length of a bottom horizontal surface of said covering member and at a rearward portion thereof,
   means connected to said covering member for supporting the covering member in a substantially horizontal position with respect to the vertical axis of the workplace system, and
   means defining an acoustically-controlled workplace compartment formed by the respective table and covering members together with the respective table and covering support members, said workplace compartment means providing a workplace which substantially surrounds a person working therewithin so as to effectively acoustically and aesthetically separate said person from the surrounding environment.

15. A two-compartment, adjustable multi-functional, space-saving workplace system, which comprises:
   a pair of single-compartment, multi-functional, space-saving workplace systems joined on to the other,
   each respective single-compartment workplace system comprising a substantially horizontal table member, the plan configuration of said horizontal table member being substantially V-shaped;
   means within said table member defining a first slot for receiving and interlockingly attaching at least one accessory means in place therewith, said first slot means located across the length of a top horizontal surface of said table member and at a reward portion thereof;
   a work surface formed in a portion of said table member forward of said first slot means;
   means connected to said table member for supporting the table member in a substantially horizontal position with respect to the vertical axis of the workplace system,
   a substantially horizontally-disposed covering member located above the first slot means and disposed substantially parallel to the top horizontal surface of said table member;
   means within said table member defining a second slot for receiving and interlockingly attaching at least one accessory means in place therewithin, said second slot means located across the length of a bottom horizontal surface of said covering member and at a rearward portion thereof, and
   means defining an acoustically-controlled workplace compartment formed by the respective table and covering members together with the respective table and covering support means, said workplace compartment means providing a workplace which substantially surrounds a person working therewithin so as to effectively acoustically and aesthetically separate said person from the surrounding environment.

16. A four-compartment adjustable, multi-functional, space-saving workplace system, which comprises:
   four single-compartment, multi-functional, space-saving workplace systems joined one to the other,
   each respective single-compartment workplace system comprising a substantially horizontal table member, the plan configuration of said horizontal table member being substantially V-shaped;
   means within said table member defining a first slot for receiving and interlockingly attaching at least one accessory means in place therewithin, said first slot means located across the length of a top horizontal surface of said table member and at a rearward portion thereof, a work surface formed in a portion of said table member forward of said first slot means;
   means connected to said table member for supporting the table member in a substantially horizontal position with respect to the vertical axis of the workplace system,
   a substantially horizontally-disposed covering member located above the first slot means and disposed substantially parallel to the top horizontal surface of said table member;
   means within said table member defining a second slot for receiving and interlockingly attaching at least one accessory means in place therewithin, said second slot means located across the length of a bottom horizontal surface of said covering member and at a rearward portion thereof, and
   means defining an acoustically-controlled workplace compartment formed by the respective table and covering members together with the respective table and covering support members, said workplace compartment means providing a workplace which substantially surrounds a person working therewithin so as to effectively acoustically and aesthetically separate said person from the surrounding environment.

17. A method for producing an acoustically-controlled adjustable, multi-functional, space-saving workplace system, which comprises:

forming a substantially horizontal table member, the plan configuration of said horizontal table member being substantially V-shaped;

providing within said table member means defining a first slot for receiving and interlockingly attaching at least one accessory means in place therewithin, said first slot means located across the length of a top horizontal surface of said table member and at a rearward portion thereof;

forming a work surface for conducting workplace operations in a portion of said table member forward of said first slot means;

supporting the table member in a substantially horizontal position with respect to the vertical axis of the workplace system, forming a substantially horizontally-disposed covering member located above, and disposed substantially parallel to, the top horizontal surface of said table member;

providing within said table member means defining a second slot for receiving and interlockingly attaching at least one accessory means in place therewithin, said second slot means located across the length of a bottom horizontal surface of said covering member and at a rearward portion thereof, supporting the covering means in a substantially horizontal position with respect to the vertical axis of the workplace system, and forming means defining an acoustically-controlled workplace compartment comprising the respective table and covering members together with the respective table and covering support members, said workplace compartment means providing a workplace which substantially surrounds a person working therewithin so as to effectively acoustically and aesthetically separate said person from the surrounding environment.

18. The method of claim 17, which further includes the steps of supporting the table member in a substantially horizontal position by attachment to the table member support means only at its respective ends, and forming means defining a recessed area between the rearward V-shaped portion of the table member and the table member support means, respectively, the recessed area means being capable of forming a storage area below the top of the table member.

19. The method of claim 18, which further includes the step of providing a receptacle means within the recessed area disposed below the top horizontal surface of the table member for storing materials therewithin.

20. The method of claim 18, which further includes the step of providing stanchion means for supporting a plurality of accessory means connected thereto within the first and second slot means, respectively, in a substantially vertical position with respect, to the vertical axis of the workplace system.

21. The method of claim 17, wherein the respective first and second slot means, and the plan configuration of the covering member, are substantially V-shaped.

22. The method of claim 17, which further includes the step of supporting the respective table and covering members by a same substantially vertically-extending support means.

23. The method of claim 17, which further includes the step of attaching vertically-extending panel means to said respective table and covering members all of which together define an acoustically-controlled work enclosure capable of substantially preventing sound from entering into, or emanating from, the confines of the workplace system.

* * * * *